United States Patent
Muralidharan et al.

(10) Patent No.: US 12,235,716 B2
(45) Date of Patent: *Feb. 25, 2025

(54) MESSAGE CALL REQUEST DATA HAVING ERROR FREQUENCY METRICS

(71) Applicant: ADP, Inc., Roseland, NJ (US)

(72) Inventors: Anand Muralidharan, Chennai (IN); Kingbert Thomas, Chennai (IN); Balasubramanian Paulraj, Chennai (IN); Venkateshkumar Muthu, Chennai (IN); Vidyavathi Vennapusa, Chennai (IN); Gareth Harries, Surrey (GB); Neil Hopkins, Bristol (GB); Subramaniam Ramalingasamy, Chennai (IN); Raja Ambigapathy Karuppasamy, Chennai (IN); James Reilly, Surrey (GB)

(73) Assignee: ADP, Inc., Roseland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,367

(22) Filed: Oct. 27, 2023

(65) Prior Publication Data

US 2024/0061737 A1 Feb. 22, 2024

Related U.S. Application Data

(63) Continuation of application No. 17/305,676, filed on Jul. 13, 2021, now Pat. No. 11,803,438.

(51) Int. Cl.
*G06F 11/00* (2006.01)
*G06F 11/07* (2006.01)
(Continued)

(52) U.S. Cl.
CPC ...... *G06F 11/0769* (2013.01); *G06F 11/0751* (2013.01); *G06F 11/302* (2013.01);
(Continued)

(58) Field of Classification Search
CPC ............ G06F 11/0751; G06F 11/0769; G06F 11/302; G06F 11/327; G06F 11/3065; G06F 11/3086
See application file for complete search history.

(56) References Cited

U.S. PATENT DOCUMENTS 9,798,607 B1 10/2017 Kulkarni et al.
10,783,053 B1 9/2020 Demeuse et al.
(Continued)

OTHER PUBLICATIONS

Notice of Allowance issued in corresponding U.S. Appl. No. 17/305,676, dated Jun. 28, 2023 (5 pages).
(Continued)

*Primary Examiner* — Elmira Mehrmanesh
(74) *Attorney, Agent, or Firm* — Foley & Lardner LLP

(57) ABSTRACT

A method for error management is provided. The method comprises receiving a message call request regarding an error event generated by a software application. The message call request comprises a message ID associated with an error type. In response to the call request a message cache is searched for the message ID. If the ID is in the cache, an error message associated with the ID is returned. The error message provides a description of the error and suggested remedial action. If the message ID is not in the cache, the error message is fetched from a message repository that contains error messages corresponding to respective message IDs. The fetched error message is loaded into the cache and returned. Message call request data is stored in a metrics repository. The message call request data comprises frequency metrics that describe how often the message ID is received.

20 Claims, 7 Drawing Sheets

(51) Int. Cl.
  *G06F 11/30* (2006.01)
  *G06F 11/32* (2006.01)
  *G06F 12/0875* (2016.01)
(52) U.S. Cl.
  CPC ...... *G06F 11/3065* (2013.01); *G06F 11/3086* (2013.01); *G06F 11/327* (2013.01); *G06F 12/0875* (2013.01); *G06F 2212/1021* (2013.01)

(56) References Cited

U.S. PATENT DOCUMENTS

| | | |
|---|---|---|
| 11,269,712 B1 | 3/2022 | Ahmed et al. |
| 11,411,811 B2 | 8/2022 | Paradkar et al. |
| 11,803,438 B2 * | 10/2023 | Muralidharan ..... G06F 11/0769 |
| 2005/0138486 A1 | 6/2005 | Gromyko |
| 2010/0100777 A1 | 4/2010 | Ziegler |
| 2014/0068343 A1 | 3/2014 | Nakajima et al. |
| 2018/0005246 A1 * | 1/2018 | Basam ................ G06F 11/0709 |
| 2019/0026172 A1 | 1/2019 | Wu et al. |
| 2020/0201699 A1 | 6/2020 | Yu et al. |
| 2020/0394091 A1 | 12/2020 | Kokubun et al. |

OTHER PUBLICATIONS

US Office Action issued in corresponding U.S. Appl. No. 17/305,676, dated Apr. 19, 2023 (13 pages).
US Office Action issued in corresponding U.S. Appl. No. 17/305,676, dated Aug. 17, 2022 (11 pages).

* cited by examiner

MESSAGE CALL REQUEST DATA HAVING ERROR FREQUENCY METRICS

1. CROSS-REFERENCE TO RELATED APPLICATION

This application claims the benefit of priority under 35 U.S.C. § 120 as a continuation of U.S. patent application Ser. No. 17/305,676, filed Jul. 13, 2021, and issued as U.S. Pat. No. 11,803,438 on Oct. 31, 2023, which is hereby incorporated by reference herein in its entirety.

2. FIELD

The present disclosure relates generally to an improved computer system and, in particular, to a method and system for managing error messages generated by software products in response to user inputs.

3. BACKGROUND

Many software applications and products generate error messages in response to user inputs that violate business rules that define constraints or definitions of processes the applications perform. Such error messages occur in response to unforeseen problems that require user intervention. Error messages typically identify the error in question and may also provide information regarding how to correct the error.

Therefore, it would be desirable to have a method and apparatus that take into account at least some of the issues discussed above, as well as other possible issues.

SUMMARY

An illustrative embodiment provides a computer-implemented method for error management. The method comprises receiving a message call request regarding an error event generated by a software application, wherein the message call request comprises a message ID associated with an error type. In response to the message call request a message cache is searched for the message ID. If the message ID is in the message cache, an error message associated with the message ID is returned from the message cache, wherein the error message provides a description of the error event and suggested remedial action to a user of the software application. If the message ID is not in the message cache, the error message associated with the message ID is fetched from a message repository, wherein the message repository contains a number of error messages corresponding to respective message IDs. The fetched error message is loaded into the message cache and returned. Message call request data is stored in a metrics repository, wherein the message call request data comprises error frequency metrics that describe how frequently the message ID is received from users.

Another illustrative embodiment provides a system for error management. The system comprises a storage device configured to store program instructions and one or more processors operably connected to the storage device and configured to execute the program instructions to cause the system to: receive a message call request regarding an error event generated by a software application, wherein the message call request comprises a message ID associated with an error type; search a message cache for the message ID, wherein the message; if the message ID is in the message cache, return an error message associated with the message ID from the message cache, wherein the error message provides a description of the error event and suggested remedial action to a user of the software application; if the message ID is not in the message cache: fetch the error message associated with the message ID from a message repository, wherein the message repository contains a number of error messages corresponding to respective message IDs; load the error message into the message cache; and return the error message; and store message call request data in a metrics repository, wherein the message call request data comprises error frequency metrics that describe how frequently the message ID is received from users.

Another illustrative embodiment provides a computer program product for error management. The computer program product comprises a computer-readable storage medium having program instructions embodied thereon to perform the steps of: receiving a message call request regarding an error event generated by a software application, wherein the message call request comprises a message ID associated with an error type; searching a message cache for the message ID, wherein the message; if the message ID is in the message cache, returning an error message associated with the message ID from the message, wherein the error message provides a description of the error event and suggested remedial action to a user of the software application; if the message ID is not in the message cache: fetching the error message associated with the message ID from a message repository, wherein the message repository contains a number of error messages corresponding to respective message IDs; loading the error message into the message cache; and returning the error message; and storing message call request data in a metrics repository, wherein the message call request data comprises error frequency metrics that describe how frequently the message ID is received from users.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that error messages displayed to produce users in response to a software error might not provide sufficient clarity to assist the user in correcting or avoiding the error. The illustrative embodiments recognize and take into account that rendering error messages without enough clarity can result in more help tickets to product support being generated by customers.

The illustrative embodiments also recognize and take into account that updates/revisions to such error messages have to wait until the next software version release.

The illustrative embodiments recognize and take into account that current error messaging does not enable identifying which messages are getting returned to the customers.

The illustrative embodiments provide message cloud system that displays error messages based on customer setup data when saving, opening, or editing a form in an application. The message cloud enables an option for the user to access additional information regarding an error generated by an application via a business rule. This additional information may help users resolve errors themselves by displaying the reasons for the errors in question and providing information regarding how to address them. The message cloud provided by the illustrative embodiments can act as a common endpoint for multiple software applications/products.

Figure 1:
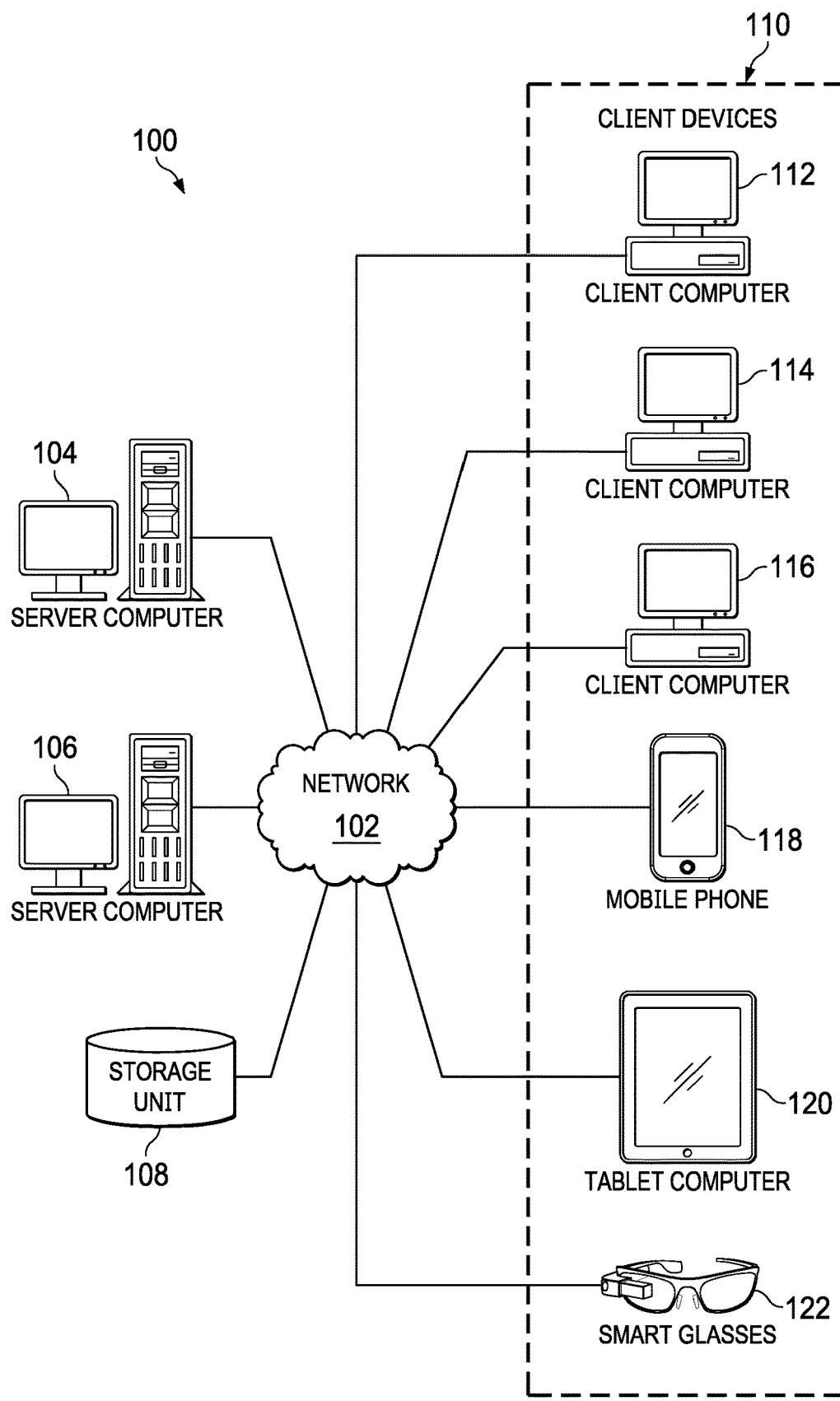
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
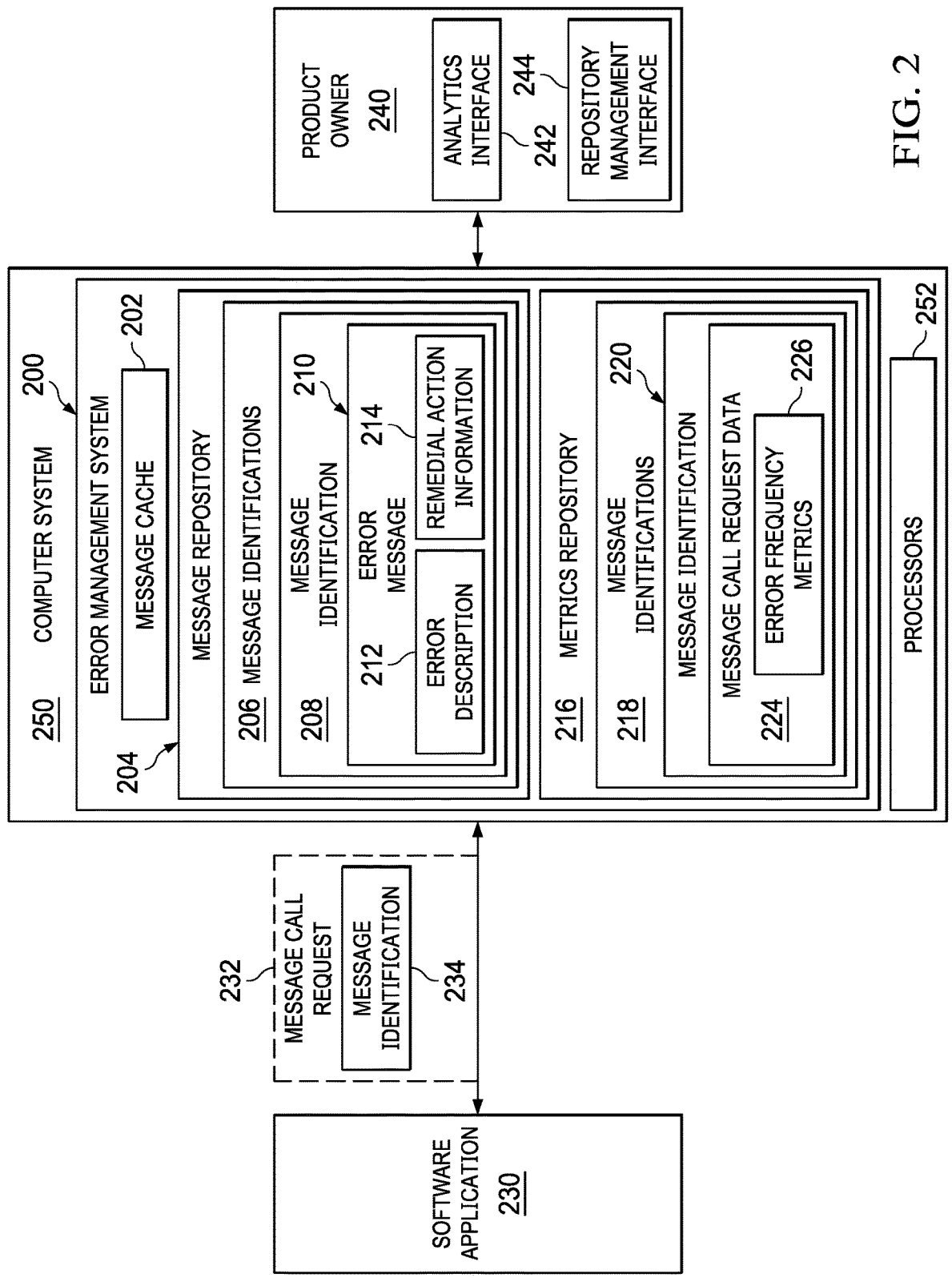
FIG. 2 depicts a block diagram illustrating an error management system in accordance with an illustrative embodiment.

FIG. 2 depicts a block diagram illustrating an error management system in accordance with an illustrative embodiment. Error management system 200 might be implemented in network data processing system 100 in FIG. 1.

Error management system 200 comprises message cache 202 and message repository 204, which are configured to provide an error message 210 in response to a message call request 232 received from a software application 230 being used by an end user.

Each message call request 232 generated by software application 230 comprises a message ID 234, which identifies the type of error made by the user. Message repository 204 contains a number of message IDs 206 that are each associated with a respective error type. Each message ID 208 has a corresponding error message 210 that may include a description 212 of the error in question and remedial action information 214 to assist the user in correcting and avoiding the error.

In response to matching the message ID 234 in message call request 232 to a message ID 208 in the message repository, error management system 200 loaded error message 210 into message cache 202, if the message is not already in the cache, and returns the error message 210 to software application 230 to assist the user in resolving the error.

As message call requests are received and processed by error management system 200, the system stores information about the message call requests and error messages in a metrics repository 216. Metrics repository 216 stores the messages IDs 218 associated with the message call requests received by error management system 200. Each message ID 220 in the metrics repository 216 is associated with message call request information 224 that might comprise error frequency metrics 226. The error frequency metrics 226 provide information about how frequently the error denoted by a message ID occurs with a given software application/product such as software application 230.

The information stored in metrics repository 216 provides product owner 240 with feedback regarding which specific errors are being triggered through/by software application 230 and how often. The product owner 240 can use an Analytics interface 242 to analyze and track error metrics to decide if and how to revise error messages returned to users. Such revisions and updates can be made to the error messages via a repository management interface 244. The product owner might also create new error messages for errors that do not current have an error message linked to them by a message ID.

Analytics interface 242 might display a number of dashboards to the product owner 240 to evaluate the metrics. Product owner 240 may identify which area or software module has been most affecting the customer(s). Statistic may be split by category/module, and the categories/modules may be ranked. Product owner 240 may also be able to filter by category/module and identify which message codes/IDs are the most and least frequently displayed to end users, along with periodic incremental trend graphs. Product owner 240 may see a daily breakdown of data along the customer database affected to determine which specific customers are most impacted. Product owner 240 may view the count of message codes displayed by context within the software products/applications, which allows the product owner 240 to focus on highly affected codes across different contexts. The product owner 240 can also track the effect of changes to a message code determined if the changes have increased or decreased errors among end users.

Error management system 200 can be implemented in software, hardware, firmware, or a combination thereof. When software is used, the operations performed by error management system 200 can be implemented in program code configured to run on hardware, such as a processor unit. When firmware is used, the operations performed by error management system 200 can be implemented in program code and data and stored in persistent memory to run on a processor unit. When hardware is employed, the hardware may include circuits that operate to perform the operations in error management system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for error management system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, error management system 200 can run on one or more processors 252 in computer system 250. As used herein a processor is a hardware device and is comprised of hardware circuits such as those on an integrated circuit that respond and process instructions and program code that operate a computer. When processors 252 execute instructions for a process, one or more processors can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

Figure 3A:
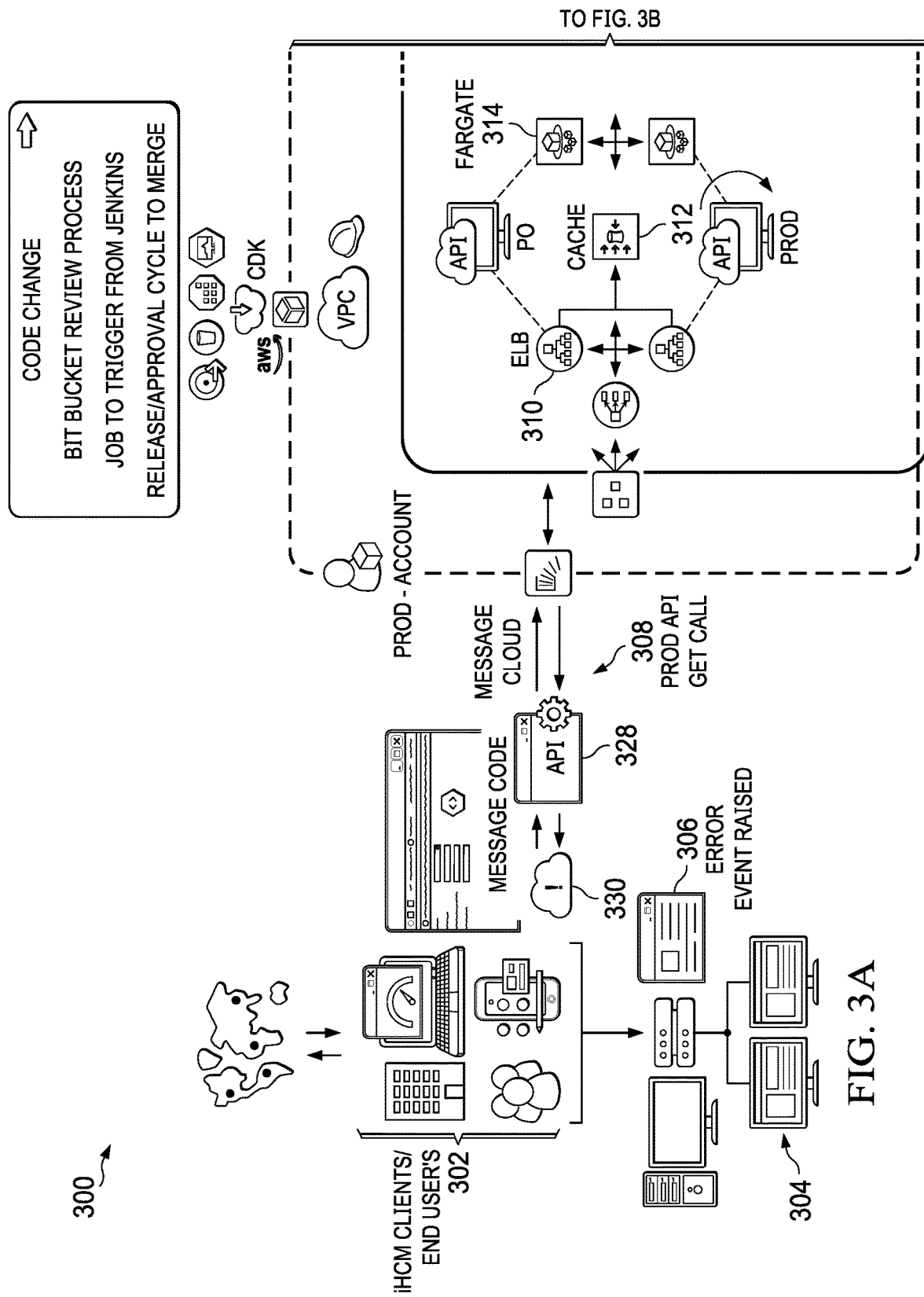
FIGS. 3A and 3B depict a diagram illustrating the operation of the message cloud error management system in accordance with an illustrative embodiment.
Figure 3B:
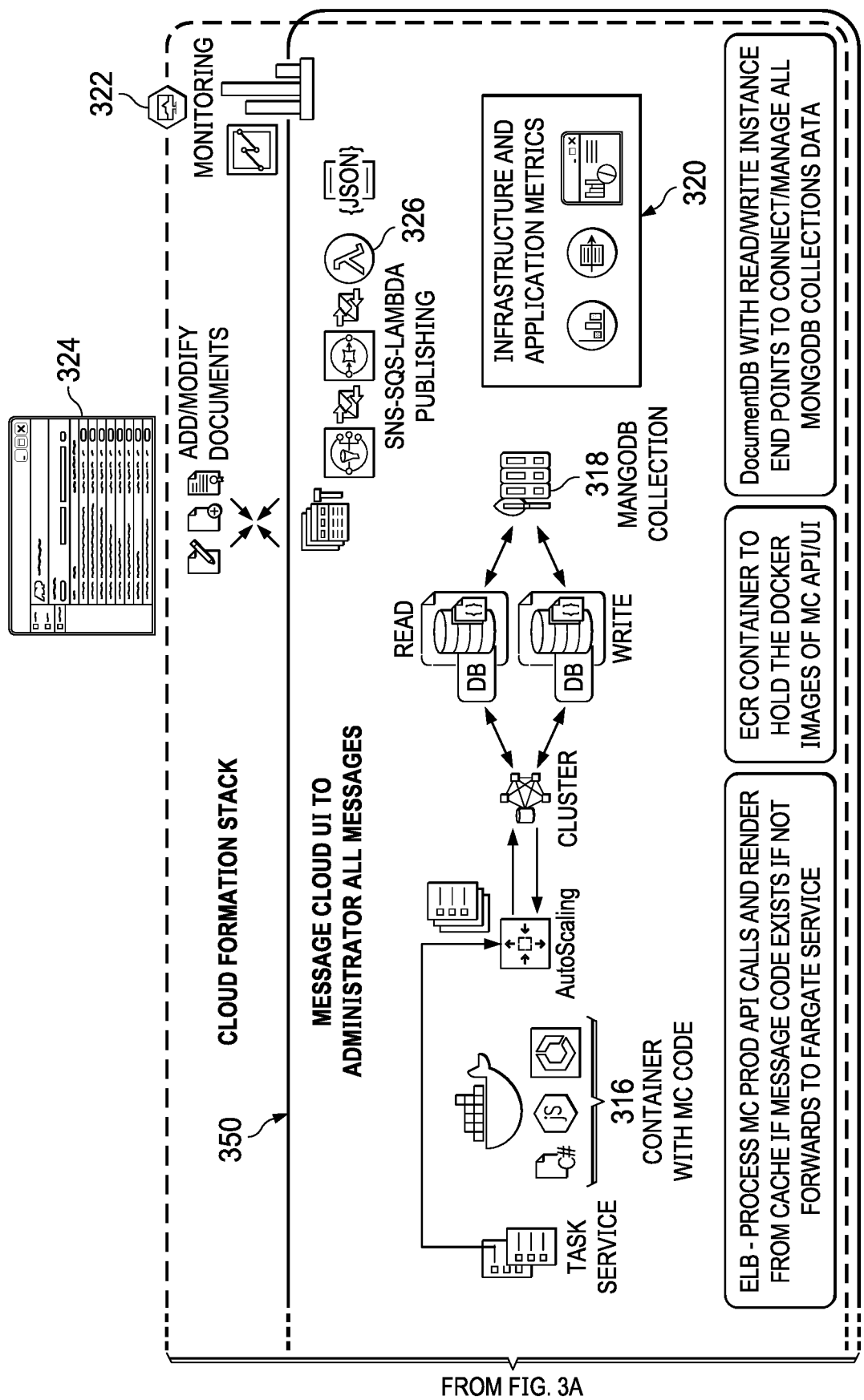

FIGS. 3A and 3B depict a diagram illustrating the operation of the message cloud error management system in accordance with an illustrative embodiment. Process 300 might be carried out in error management system 200 in FIG. 2.

End users 302 using software products on client devices 304 generate error events 306. The error event 306 generates an application programming interface (API) call 308 for message cloud 350.

Elastic load balancing (ELB) 310 processes the message cloud product API call 308 and determines if the appropriate error message is already loaded into message cache 312. If the error message is in the message cache 312, the ELB 310 returns the message code 328, which generates the error message 330 on the client device 304.

If the error message is not in the message cache 312, the ELB 310 forwards the API call 308 to Fargate service 314. Fargate service 314 access elastic container registry (ECR) container 316 that holds docker images of the message cloud API/UI (user interface), allowing access to the message repository stored in database 318. The required message code 328 is retrieved from database 318 and returned to the end user 302 and stored in message cache 312 for faster access by future API calls.

Message cloud 350 continually gathers and stores metrics 320 related to API calls for error message codes. These metrics 320 can be monitored by the product owner through an Analytics interface 322. If the product owner decides to update and revise an error message, the product owner may use a message cloud repository management interface 324 to modify the error message via, e.g., Amazon Web Services (AWS) Lambda publishing 326, which stores the revised error message in database 318.

Figure 4:
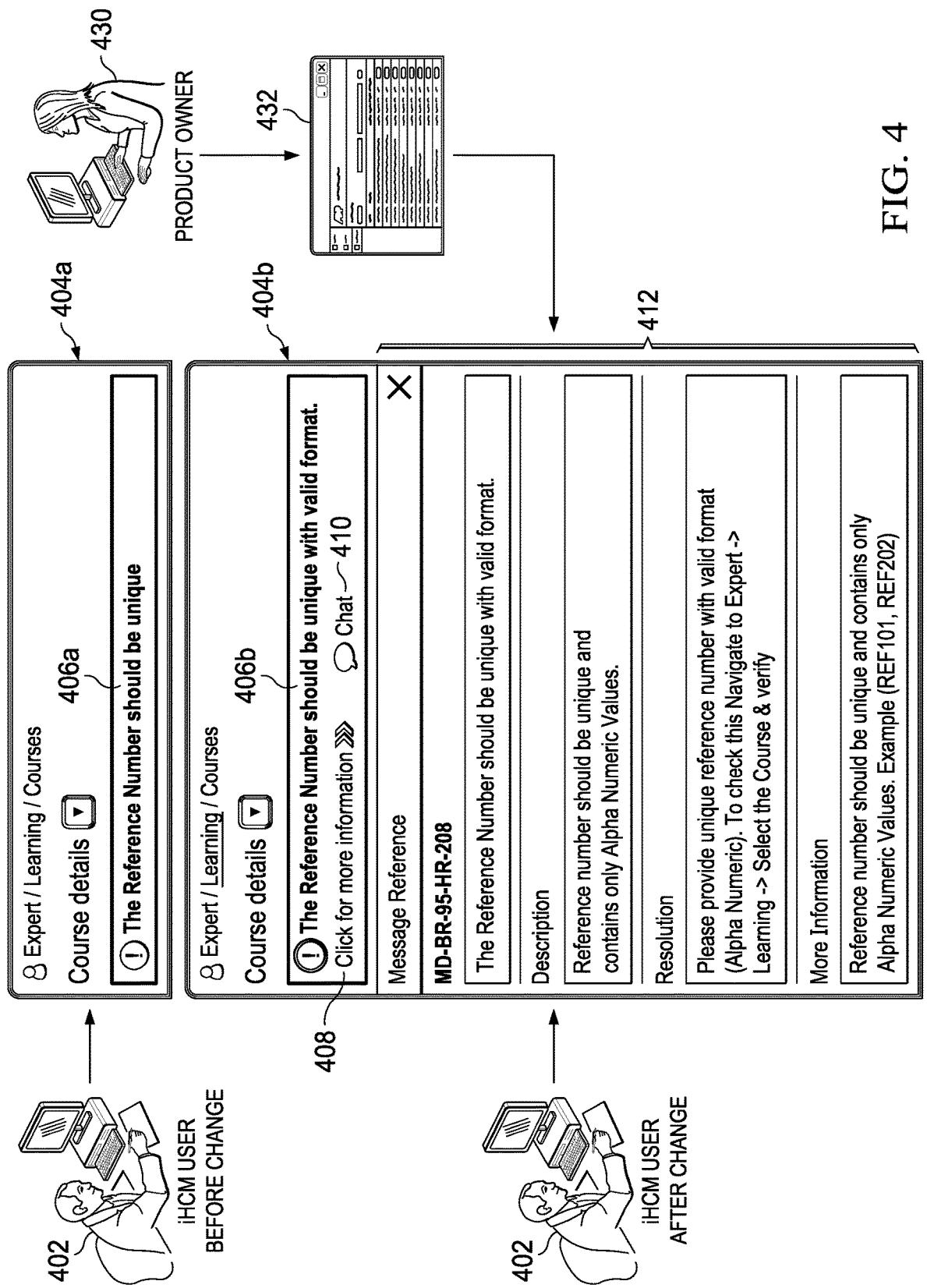
FIG. 4 depicts a diagram illustrating revision to an error message in accordance with an illustrative embodiment.

FIG. 4 depicts a diagram illustrating revision to an error message in accordance with an illustrative embodiment. In the present example, a user 402 is creating a form with a human capital management application, which might be an example of software application 230 in FIG. 2.

In the process of creating the form, user 402 receives an error message 404*a* that includes a description 406*a* of the error. In the present example, user 402 has not given the course being created with the application a unique reference number, which has triggered the error message 404*a*.

Product owner 430 is able to monitor error frequency metrics associated with error message 404*a* in a metrics repositor such as metrics repository 216 in FIG. 2. If the product owner 430 decides that the error frequency metrics are too high or receives a notice from the message cloud system that the error frequency metrics exceed a specified threshold, the product owner 430 can revise and update the error message to make it more user friendly. This revision can be accomplished via repository management interface 432, which might be an example of repository management interface 244 in FIG. 2.

The result of the revision is an updated error message 404*b* with a revised error description 406*b*. In this example, error message 404*b* now includes a button 408 to obtain more information and a chat option 410. Selecting button 408 calls up a dropdown tab 412 that provided additional details and recommended corrective action regarding the error.

Figure 5:
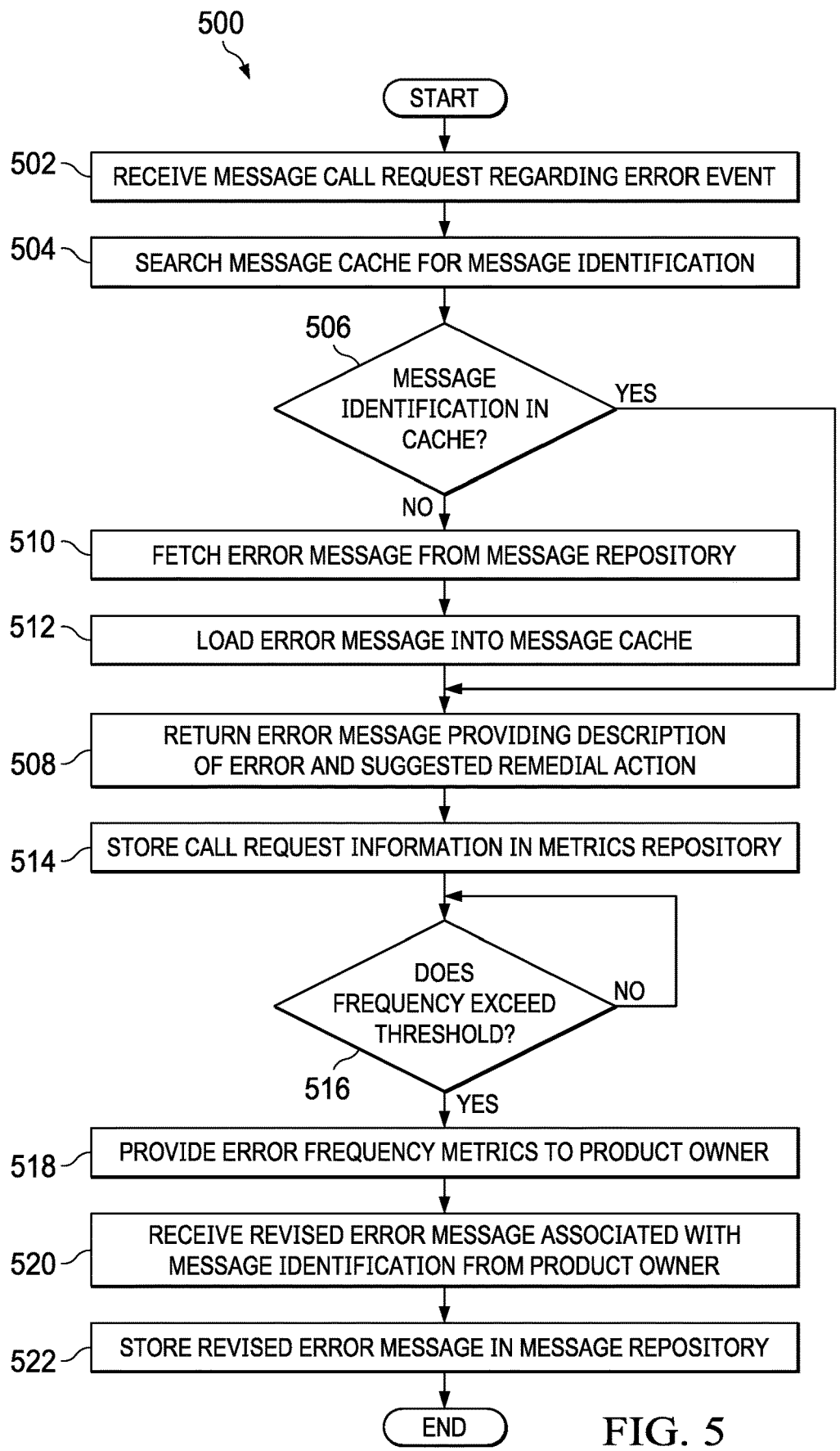
FIG. 5 depicts a flowchart illustrating a process for improved error management in accordance with an illustrative embodiment.

FIG. 5 depicts a flowchart illustrating a process for improved error management in accordance with an illustrative embodiment. Process 500 can be implemented in hardware, software, or both. When implemented in software, the process can take the form of program code that is run by one or more processor units located in one or more hardware devices in one or more systems. Process 500 might be implemented in error management system 200 in FIG. 2.

Process 500 begins by the system receiving a message call request regarding an error event generated by a software application (step 502). The message call request comprises a message ID associated with an error type.

The system searches a message cache for the message ID (step 504) and determines if the messages ID is in the message cache (step 506). If the message ID is in the message cache, the system returns from the cache an error message associated with the message ID to the user using the software application (step 508). The error message provides a description of the error event and suggested remedial action to a user of the software application. The error message might comprise at least one of text, video, audio, hyperlinks, uniform resource locators, chat, and multilingual language support. Message components comprising text may be in a default language of the software application and support multiple languages.

If the message ID is not in the message cache, the system fetches the error message associated with the message ID from a message repository (step 510). The message repository contains error messages corresponding to respective message IDs. The system loads the fetched error message into the message cache (step 512) and then returns the error message associated with the message ID to the user (step 508). The error message remains in the message cache until removed from the cache as needed to make room for more recently accessed error messages.

The system stores message call request data in a metrics repository (step 514). The message call request data comprises error frequency metrics that describes how frequently the message ID is received from users. Metrics repository data can be monitored and analyzed by a product owner using an Analytics user interface. The metrics repository may track specific message call requests, and the contexts of the message call requests, received over time. The metrics repository may track software applications generating the message call requests received over time.

The system continually monitors the frequency metrics (step 516). If the error frequency metrics exceed a defined threshold, the system may notify a product owner (step 518). If the frequency metrics exceed the defined threshold, it is an indication that the current error message might not provide adequate or clear enough information/guidance to users to prevent or reduce recurrence of the same error.

The message repository allows dynamic updates of message records by a product owner using a repository management user interface. Updates of the message records do not require changes to the software application. If the product owner updates an error message in response to the error frequency metrics, the system receives the revised error message associated with the message ID from the product owner (step 520) and stores the revised error message in the message repository (step 522). Process 500 terminates thereafter.

Figure 6:
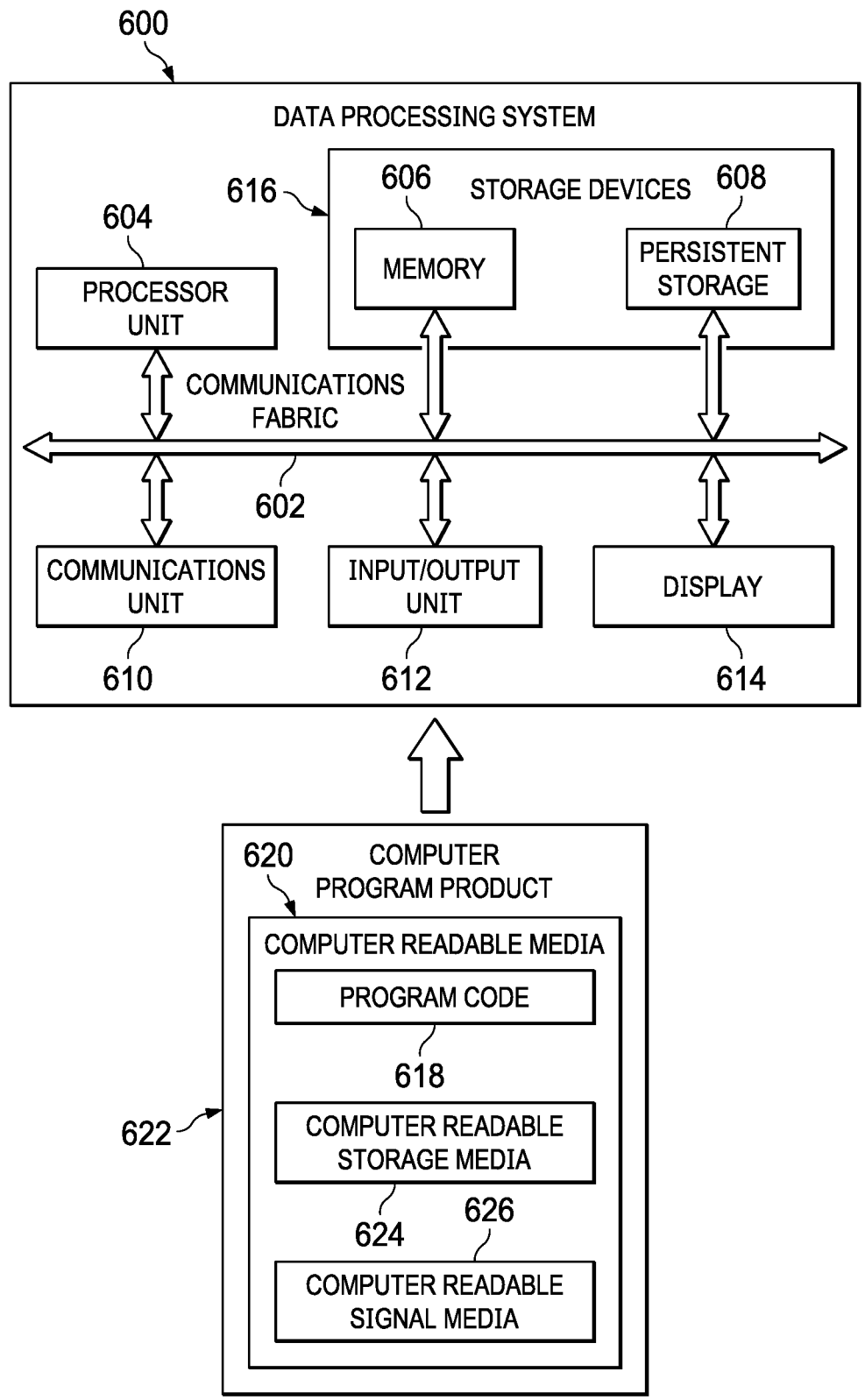
FIG. 6 is a block diagram of a data processing system in accordance with an illustrative embodiment.

Turning now to FIG. 6, an illustration of a block diagram of a data processing system is depicted in accordance with an illustrative embodiment. Data processing system 600 may be used to implement server computer 104 and server computer 106 and client devices 110 in FIG. 1, as well as error management system 200 in FIG. 2. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general-purpose central processing units (CPUs). In an alternate embodiment, processor unit 604 comprises one or more graphical processing units (GPUs).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Computer readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system, comprising:
one or more processors coupled with memory, wherein the one or more processors are configured to:
identify, responsive to a message call request to report an error detected in a software application accessed by a client device, an error message to be provided to the client device, the message call request comprising a message identification ("ID") associated with the error;
receive, responsive to a determination that the message ID is absent from a cache, via an interface in a container image configured to provide access to a message repository, the error message from the message repository;
determine, based on a comparison of an error metric associated with the error and a threshold, to update the error message for a type of the error;
generate, responsive to the determination to update the error message, an updated error message based on the error message; and
transmit, to one or more client devices, in response to one or more message call requests related to the type of the error, the updated error message.

2. The system of claim 1, wherein the one or more processors are further configured to:
fetch, responsive to the determination that the message ID is absent from the cache, the error message associated with the message ID from the message repository, wherein the message repository contains a plurality of error messages corresponding to respective message IDs; and
store the error message for the message ID in the cache.

3. The system of claim 2, wherein to fetch the error message, the one or more processors are further configured to:
forward an application programming interface call to a service to access a registry holding container images of a message cloud interface configured to allow access to the message repository.

4. The system of claim 2, wherein the one or more processors are further configured to:
receive a second message call request for a second error detected in the software application accessed by a second client device, the second message call request comprising the message ID;
determine the message ID is stored in the cache;
retrieve, from the cache, the error message responsive to the message ID; and
provide, to the second client device, the error message retrieved from the cache.

5. The system of claim 1, wherein to generate the updated error message, the one or more processors are further configured to:
receive, via a repository management interface, a revised description for the error message; and
create the updated error message with the revised description.

6. The system of claim 1, wherein to generate the updated error message, the one or more processors are further configured to:
configure the error message with an interactive user interface element.

7. The system of claim 1, wherein to generate the updated error message, the one or more processors are further configured to:
add an expandable element to the error message, the expandable element configured to provide at least one of additional details or a corrective action.

8. The system of claim 1, wherein to generate the updated error message, the one or more processors are further configured to:
add an interactive user interface element to the error message, the interactive user interface element configured to access a chat feature.

9. The system of claim 1, wherein the one or more processors are further configured to:
receive a second message call request for a second error detected in the software application accessed by a second client device, the second message call request related to the type of the error; and
provide the updated error message to the second client device, the updated error message displayed via the software application accessed by the second client device without an update being applied to the software application.

10. The system of claim 1, wherein the error message comprises at least one of text, video, audio, a hyperlink, a uniform resource locator, chat, or multilingual language support.

11. The system of claim 1, wherein the threshold comprises a frequency threshold, and the one or more processors are further configured to:
receive message call requests from a plurality of client devices that access the software application;
determine one or more types of error messages from the message call requests; and
generate, based on the one or more types of error messages and a count of the message call requests received from the plurality of client devices, the error metric comprising a frequency of occurrence of the type of the error message.

12. The system of claim 1, wherein the one or more processors are further configured to:
provide an analytics dashboard comprising one or more error metrics related to message call requests received from a plurality of client devices that access the software application.

13. A method, comprising:
identifying, by one or more processors coupled with memory, responsive to a message call request to report an error detected in a software application accessed by a client device, an error message to be provided to the client device, the message call request comprising a message identification ("ID") associated with the error;
receiving, by the one or more processors, responsive to a determination that the message ID is absent from a cache, via an interface in a container image configured to provide access to a message repository, the error message from the message repository;
determining, by the one or more processors, based on a comparison of an error metric associated with the error and a threshold, to update the error message for a type of the error;
generating, by the one or more processors responsive to determining to update the error message, an updated error message based on the error message; and
transmitting, by the one or more processors to one or more client devices, in response to one or more message call requests related to the type of the error, the updated error message.

14. The method of claim 13, comprising:
fetching, by the one or more processors, responsive to the determination that the message ID is absent from the cache, the error message associated with the message ID from the message repository, wherein the message repository contains a plurality of error messages corresponding to respective message IDs; and
storing, by the one or more processors, the error message for the message ID in the cache.

15. The method of claim 14, wherein fetching the error message further comprises:
forwarding, by the one or more processors, an application programming interface call to a service to access a registry holding container images of a message cloud interface configured to allow access to the message repository.

16. The method of claim 14, comprising:
receiving, by the one or more processors, a second message call request for a second error detected in the software application accessed by a second client device, the second message call request comprising the message ID;
determining, by the one or more processors, the message ID is stored in the cache;
retrieving, by the one or more processors from the cache, the error message responsive to the message ID; and providing, by the one or more processors to the second client device, an indication of the error message retrieved from the cache.

17. The method of claim 13, wherein generating the updated error message further comprises:
configuring, by the one or more processors, the error message with an interactive user interface element.

18. The method of claim 13, wherein generating the updated error message further comprises:
adding, by the one or more processors, an expandable element to the error message, the expandable element configured to provide at least one of additional details or a corrective action.

19. The method of claim 13, wherein the threshold comprises a frequency threshold, and the method further comprises:
receiving, by the one or more processors, message call requests from a plurality of client devices that access the software application;
determining, by the one or more processors, one or more types of error messages from the message call requests; and
generating, by the one or more processors, based on the one or more types of error messages and a count of the message call requests received from the plurality of client devices, the error metric comprising a frequency of occurrence of the type of the error message.

20. A non-transitory computer-readable medium storing processor executable instructions, wherein the processor executable instructions executed by one or more processors cause the one or more processors to:
identify, responsive to a message call request to report an error detected in a software application accessed by a client device, an error message to be provided to the client device, the message call request comprising a message identification ("ID") associated with the error;
receive, responsive to a determination that the message ID is absent from a cache, via an interface in a container image configured to provide access to a message repository, the error message from the message repository;
determine, based on a comparison of an error metric associated with the error and a threshold, to update the error message for a type of the error;
generate, responsive to the determination to update the error message, an updated error message based on the error message; and
transmit, to one or more client devices, in response to one or more message call requests related to the type of the error, the updated error message.

\* \* \* \* \*